(12) United States Patent
Jarvie et al.

(10) Patent No.: US 7,825,816 B2
(45) Date of Patent: Nov. 2, 2010

(54) SENSING DEVICE ARRANGEMENT FOR FUEL STORAGE TANKS

(76) Inventors: Ian F. Jarvie, 9 Wolfe Ct., Woodridge, IL (US) 60517; Przemyslaw Olaf Iwaszczyszyn, 1015 7th Ave., La Grange, IL (US) 60525

( * ) Notice: Subject to any disclaimer, the term of this patent is extended or adjusted under 35 U.S.C. 154(b) by 389 days.

(21) Appl. No.: 11/841,465

(22) Filed: Aug. 20, 2007

(65) Prior Publication Data
US 2009/0051554 A1 Feb. 26, 2009

(51) Int. Cl.
*G08B 21/00* (2006.01)
(52) U.S. Cl. ..................................... 340/612
(58) Field of Classification Search .............. 340/612, 340/622, 614, 632, 618, 611
See application file for complete search history.

(56) References Cited

U.S. PATENT DOCUMENTS

| | | | |
|---|---|---|---|
| 3,972,201 A | 8/1976 | Datis | |
| 4,487,065 A * | 12/1984 | Carlin et al. | 73/290 V |
| 4,835,521 A | 5/1989 | Andrejasich et al. | |
| 5,008,653 A | 4/1991 | Kidd et al. | |
| 5,076,100 A * | 12/1991 | Hunter et al. | 73/290 V |
| 5,202,667 A | 4/1993 | Alvin | |
| 5,461,906 A * | 10/1995 | Bogle et al. | 73/49.2 |
| 6,169,938 B1 * | 1/2001 | Hartsell, Jr. | 700/302 |
| 6,295,018 B1 | 9/2001 | Diede et al. | |
| 6,577,960 B1 | 6/2003 | Rabelo et al. | |
| 6,909,986 B2 * | 6/2005 | Rogers et al. | 702/156 |
| 2007/0131864 A1 * | 6/2007 | Ellis et al. | 250/343 |

FOREIGN PATENT DOCUMENTS

| | | |
|---|---|---|
| DE | 4017533 | 12/1990 |
| DE | 4410597 | 9/1995 |
| DE | 19813349 | 9/1999 |
| EP | 0 406 718 | 1/1991 |

OTHER PUBLICATIONS

Frank Wartenhorst, International Search Report and Written Opinion, Oct. 18, 2007, 14 pages, European Patent Office.
Glenn Richard Marshall; Site Management System for Containing Hazardous Spills and Leaks, U.S. Statutory Invention Registration No. H1676; filed Mar. 26, 1996; 8 pages; United States.
Marcel Daman (Officer); International Search Report and Written Opinion; May 14, 2008; 11 pages; European Patent Office.
Marcel Daman; International Preliminary Report on Patentability issued in related PCT application No. PCT/US2007/076327; Sep. 29, 2009; 7 pages, European Patent Office.

* cited by examiner

*Primary Examiner*—Phung Nguyen
(74) *Attorney, Agent, or Firm*—Wood, Herron & Evans, L.L.P.

(57) ABSTRACT

A sensing device arrangement for a fuel storage system is provided having at least one storage tank, a plurality of sensing devices positioned in or around the at least one storage tank, and a controller in electrical communication with the plurality of sensing devices. The controller is configured to communicate with each sensing device of the plurality of sensing devices on a single bi-directional data line. A sensing device of the plurality of sensing devices is activated by the controller. Data is acquired by the sensing device and transmitted to the controller over the data line. The controller instructs the sensing device to change to a low power state. The controller receives electrical characteristics from the plurality of sensing devices recognized on the data line and calculates a characteristic of the sensing device arrangement. The controller verifies compliance with an intrinsic safety barrier.

28 Claims, 4 Drawing Sheets

SENSING DEVICE ARRANGEMENT FOR FUEL STORAGE TANKS

FIELD OF THE INVENTION

This invention relates to detection devices for monitoring hazardous material storage and has particular application to the arrangement and controlling of detection devices.

BACKGROUND OF THE INVENTION

There are many conventional applications requiring the measurement of fluid (e.g., liquid or gas) parameters, such as fluid level, pressure, temperature, density, etc., within containers. One exemplary application is storage tanks (both above ground and underground) used to store fuel. For example, most gasoline stations have one or more underground storage tanks below ground to store the gasoline available for sale to customers. These tanks may range in size (e.g., 20,000 gallons) and in use, generally contain a stratified fuel sitting atop an inch or two of water.

Due to the flammable nature of fuel and its potential harmful impact on the environment, governmental regulations may require, and the owners may desire, the monitoring of certain parameters (e.g., fluid level) of the fuel contained within the tank to detect any leakage of fuel from the tank to enable the appropriate actions to be taken to prevent any further leakage. For example, contemporary EPA standards state that a change in fuel level greater than 0.1 gallons/hour constitutes a leak. There are a variety of sensing devices and systems designed to, for example, measure the fuel level, temperature and/or density within these tanks, which may then be used for fluid volume and tank leak detection calculations. There are also sensing devices and systems designed to monitor various parameters around the tanks. As is customary, the sensing devices may be operatively coupled to a central controller that receives signals from the sensing devices indicative of the state of the fuel within the tank and/or parameters surrounding the tank.

Because of the volatile and hazardous nature of the materials, power to the sensing devices may be limited by intrinsic safety barriers. Intrinsic safety barriers are generally devices that limit current, voltage, and total energy delivered to sensing device located in the hazardous area. Limiting the power to the sensing devices helps to prevent or reduce the likelihood of fires and explosions from occurring in areas containing hazardous chemicals, gases, or other ignitable atmospheres. While being necessary or desirable, these barriers add cost and complexity to the installation and set up of sensing device networks used in monitoring the storage tanks and surrounding area. Conventional networks contain sensing devices (e.g., probes, sensors, etc.) that are individually connected to their own dedicated barrier and then to a controller. In addition to the cost of the barrier for each sensing device, there is the additional cost and complexity of the cabling between the sensing device, barrier, and controller. Moreover, the voluminous amount of cabling required for conventional sensing device networks, and the complexity of its installation, requires considerable labor and expense. Furthermore, controllers must also be configured to have a separate, dedicated port for each of the sensing devices in the network, which may further increase the cost, complexity and labor associated with such sensing device networks.

In addition to that provided above, conventional sensing device networks require a significant amount of operator interaction. By way of example, when installing such a network, an operator will typically have to manually input various data about each of the sensing devices into the controller. This data may include voltages, currents, and various threshold values so that the controller knows how to use the data coming from the sensing device to determine if the sensing device is in alarm. A wrong threshold value may render the sensing device inoperable for its intended purpose. Moreover, such operator errors may be difficult to detect.

Additionally the installer is required to manually compare the ISB voltage and current parameters to the device's voltage and current parameters, and manually calculate the total capacitance and inductance of all the devices and again compare the total with the maximum safe value for the ISB. An error in the calculation of the inductance and capacitance may unintentionally result in potentially putting the sensing device in an unsafe condition, which could remain undetected.

Accordingly, one objective of the invention is to provide an improved sensing device arrangement that reduces the complexity of connecting sensing devices to a controller, not only in the number of network cable runs, but also in the number of wires within a cable.

A further objective of the invention is to reduce the amount of operator configuration at the controller after installing a sensing device.

Another objective of the invention is to ensure that the site is safe to operate by allowing the controller to check the entity parameters of the intrinsic safety barriers and compare them to the connected sensing devices to ensure that the parameters are not exceeded.

SUMMARY OF THE INVENTION

A sensing device arrangement for a fuel storage system is provided including at least one storage tank, a plurality of sensing devices positioned in or around the at least one storage tank, and a controller in electrical communication with the plurality of sensing devices. The controller is configured to communicate with each sensing device of the plurality of sensing devices on a single bi-directional data line. The sensing device arrangement in some embodiments may be configured in a multi-drop configuration of the plurality of sensing devices. Embodiments may be configured to use an asynchronous communications protocol for the electrical communication.

In some embodiments, a sensing device of the plurality of sensing devices includes an interface component having a microprocessor operable to communicate with the controller, and an active or passive sensing component electrically coupled to the interface component. The interface component may be operable to store a unique identifier for the sensing device as well as other device characteristics such as voltage, current, capacitance, inductance, threshold values, manufacturer, manufactured date, and software version.

Sensing devices of the plurality of sensing devices are activated by the controller. Data is acquired by the sensing devices and transmitted to the controller over the single bi-directional data line. After transmission of the sensor data, the controller instructs each sensing device to change to a low power state. In some embodiments, the data is compared to a threshold value for the sensing device and only transmitted if the threshold is exceeded. In some embodiments, the data is periodically transmitted from the sensing device to the controller regardless of the threshold value.

Sensing devices in a sensing device arrangement for a fuel storage system are recognized by the controller over the single bi-directional data line. In an embodiment, a discovery message is broadcast from the controller to a plurality of sensing devices in electrical communication with the controller over the data line. The controller transmits a sync character to the plurality of sensing devices over the data line. A sensing device of the plurality of sensing devices transmits its unique identifier to the controller over the data line. After receiving the unique identifier, the controller transmits a silencing instruction from the to the sensing device, where the silencing instruction causes the sensing device to ignore further discovery messages and sync characters sent from the controller. The controller broadcasts subsequent discovery messages to the plurality of sensing devices along with transmitting a subsequent sync character. A subsequent sensing device of the plurality of sensing devices that has not received a silencing instruction transmits its unique identification to the controller over the single bi-directional data line and receives a silencing instruction from the controller.

The sensing device monitors the single bi-directional data line connecting the plurality of sensing devices to ascertain if another sensing device of the plurality of sensing devices is already transmitting a unique identifier. If there are no transmissions on the single bi-directional data line, the sensing device transmits a first byte of the unique identification of the sensing device to the controller. In one embodiment, the sensing device transmits the byte of data by driving the single bi-directional data line high when transmitting a bit value of one (1) or passively allowing a pull down resistor to pull the single bi-directional data line low when transmitting a bit value of zero (0). The single bi-directional data line is monitored when transmitting the bit value of zero (0). If a high value exists on the date line when transmitting the bit value of zero (0), the sensing device ignores subsequent sync characters until the controller sends a subsequent broadcast of a discovery message. The sensing device receives a subsequent sync character from the controller, and transmits a next byte of data representing the unique identification of the sensing device in response to the sync character. The sensing device receives a silencing instruction from the controller to change from an active state to a low power state and ignore further discovery message broadcasts and sync characters from the controller. In some embodiments, a characteristic of the sensing device is transmitted with the unique identification to the controller.

Embodiments verify compliance between a sensing device arrangement and an intrinsic safety barrier for a fuel storage system by broadcasting a discovery message over a single bi-directional data line to discover a plurality of sensing devices. A controller receives electrical characteristics of the plurality of sensing devices and calculates a characteristic of the sensing device arrangement using the characteristics transmitted by the plurality of sensing devices. Compliance between the sensing device arrangement and the intrinsic safety barrier is verified. In some embodiments, in response to the characteristic of the sensing device arrangement being out of compliance with the intrinsic safety barrier, the controller shuts down the sensing device arrangement.

BRIEF DESCRIPTION OF THE DRAWINGS

These and other features, aspects and advantages of the present invention will become better understood with regard to the following description, appended claims and accompanying drawings wherein:

DETAILED DESCRIPTION

Embodiments of the present invention provide a sensing device arrangement for a fuel storage system having reduced complexity and cost when compared to conventional sensing device arrangements. Aspects of the invention provide for a significant reduction in the amount of cabling and wiring, a reduction in the space requirements for the wiring (e.g, reduced conduit size for carrying wiring), a reduction in the number of intrinsic safety barriers, a reduction in the number of ports in the controller, and other benefits. Such a reduction provides for a less complex sensing device network that assists in reducing time, costs, and labor associated with the installation of such networks. Aspects of the invention further provide for reduced operator interactions, which may in turn provide for a more accurate and reliable sensing device network.

Figure 1:
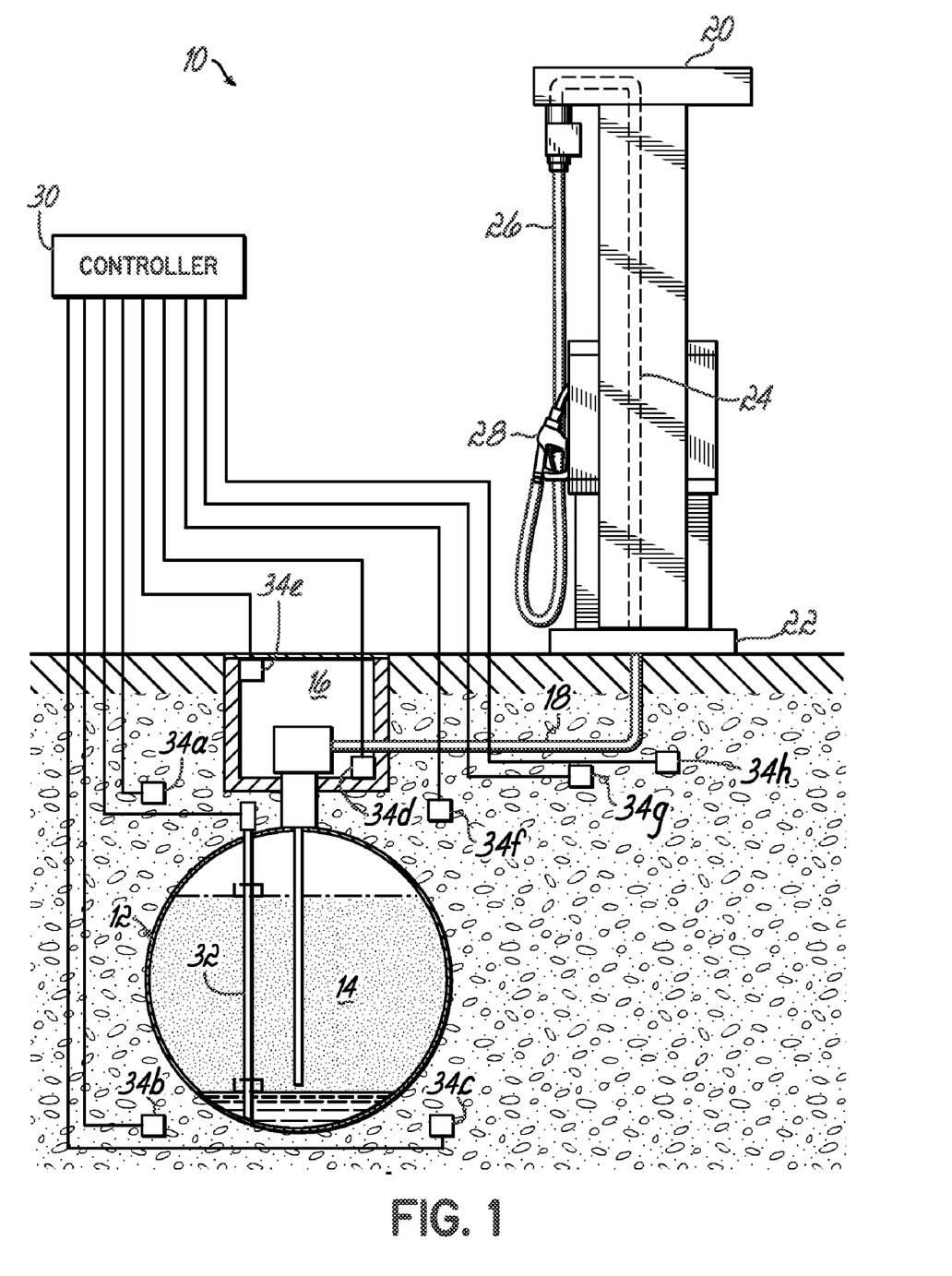
FIG. 1 is a schematic illustration of a fuel dispensing system illustrating a prior sensing device arrangement and controller.

FIG. 1 is a schematic illustration of a fuel dispensing system 10 that incorporates a conventional controller and sensing device arrangement. The fuel dispensing system 10 includes a source of fuel 12 having fuel 14 contained therein. As shown in FIG. 1, the source 12 of fuel may be an underground fuel tank, such as that used at a retail gas station for instance. The fuel dispensing system 10 includes a stand pipe extending into the fuel tank, a sump 16, various flow control and flow measurement devices (not shown) and a section of piping 18 that is mechanically and fluidicly coupled to a fuel dispensing unit 20. The fuel dispensing unit 20 is mounted on a pedestal 22, which may be made of concrete and which in turn is mounted on a surface, such as, for example, a concrete surface of a retail gas station. The fuel dispensing system 10 includes a rigid pipe or conduit 24 that extends upwardly through the interior of the dispensing unit 20. Pipe 24 is mechanically coupled and in fluid communication with pipe 18. Pipe 24 is also in fluid communication with a flexible hose 26 that terminates in a nozzle 28 that is adapted for dispensing fuel into the fuel tank of a motor vehicle, such as an automobile, truck, etc.

A controller 30 is operable to monitor a plurality of sensing devices 32, 34a-34h. The sensing devices 32, 34a-34h may include devices such as probes, sensors, or other measuring devices. For example, sensing device 32 may be a probe for monitoring the fuel level in source 12. Such probes may operate on magnetostrictive technology and are commercially available from, for example, OPW Fuel Management Systems (Hodgkins, Ill.). Such probes may further include other devices, such as temperature and density measuring devices and/or other devices for measuring various fluid properties. The sensing devices 34a-34h may generally be used to determine conditions around the fuel dispensing system. For example, the sensing devices may include temperature devices, hydrocarbon detectors, pressure devices, liquid detection device, density sensors, fluid type sensors (e.g., water, air, or hydrocarbon), and other devices for detecting a leak or monitoring operation of the system.

As shown in FIG. 1, each of the sensing devices 32, 34a-34h individually connects to the controller 30 via its own dedicated cabling and port at the controller 30. Because the sensing devices 32, 34 are generally placed in hazardous areas, in and around explosive materials, they are typically supplied power with an Intrinsic Safety Barrier ("ISB"). ISBs are devices that limit current, voltage, and total energy delivered to sensing devices 32, 34a-34h or other instrumentation located in a hazardous area. Limiting the energy prevents or reduces the likelihood of fires and explosions from occurring in areas with hazardous chemicals, gases, or other ignitable atmospheres. In the conventional configuration illustrated in FIG. 1, each sensing device 32, 34a-34h requires not only a separate connection to the controller 30, but also its own ISB, adding both complexity and cost to sensing device installations including both the cost of the ISB and the large amount of cabling and wire for connecting the individual sensing devices to the controller. Moreover, the sensing device network shown in FIG. 1 is costly and time and labor intensive to install, which further increases overall costs. Installations become even more complex and costly as additional sources of fuel are added and connected to a pump. The problem becomes even larger as more pumps are added. However, the limited power environment established by the ISBs has presented challenges for reducing the wiring and complexity of sensing device networks, as well as the time, cost and labor associated with the installation of such networks.

Embodiments in accordance with the invention present a sensing device arrangement and method to assist in overcoming the challenges with prior conventional arrangements. As shown in the schematic illustration in FIG. 2, multiple storage tanks 40a-40d, having fuel 42a-42d respectively contained therein, are mechanically and fluidicly connected through a manifold 44 to a section of piping 46 and on to a dispensing unit 48. The sensing device arrangement for such an embodiment requires fewer connections (three shown 52, 54, 56) to a controller 50 and therefore fewer ISBs (e.g. three corresponding to connections 52, 54, 56) connecting the multiple sensing devices 58a-58f, 60a-60d, and 62a-62h. As discussed in more detail below, because the ISB limits the power available to the sensing devices, all of the sensing devices along the connections 52, 54, 56 in FIG. 2 may not be simultaneously fully powered. The number of sensing devices that can be feasibly connected together depends on the type of sensing device and its power requirements including electrical characteristics such as inductance and capacitance, plus any further limitations set by the ISBs.

Figure 2:
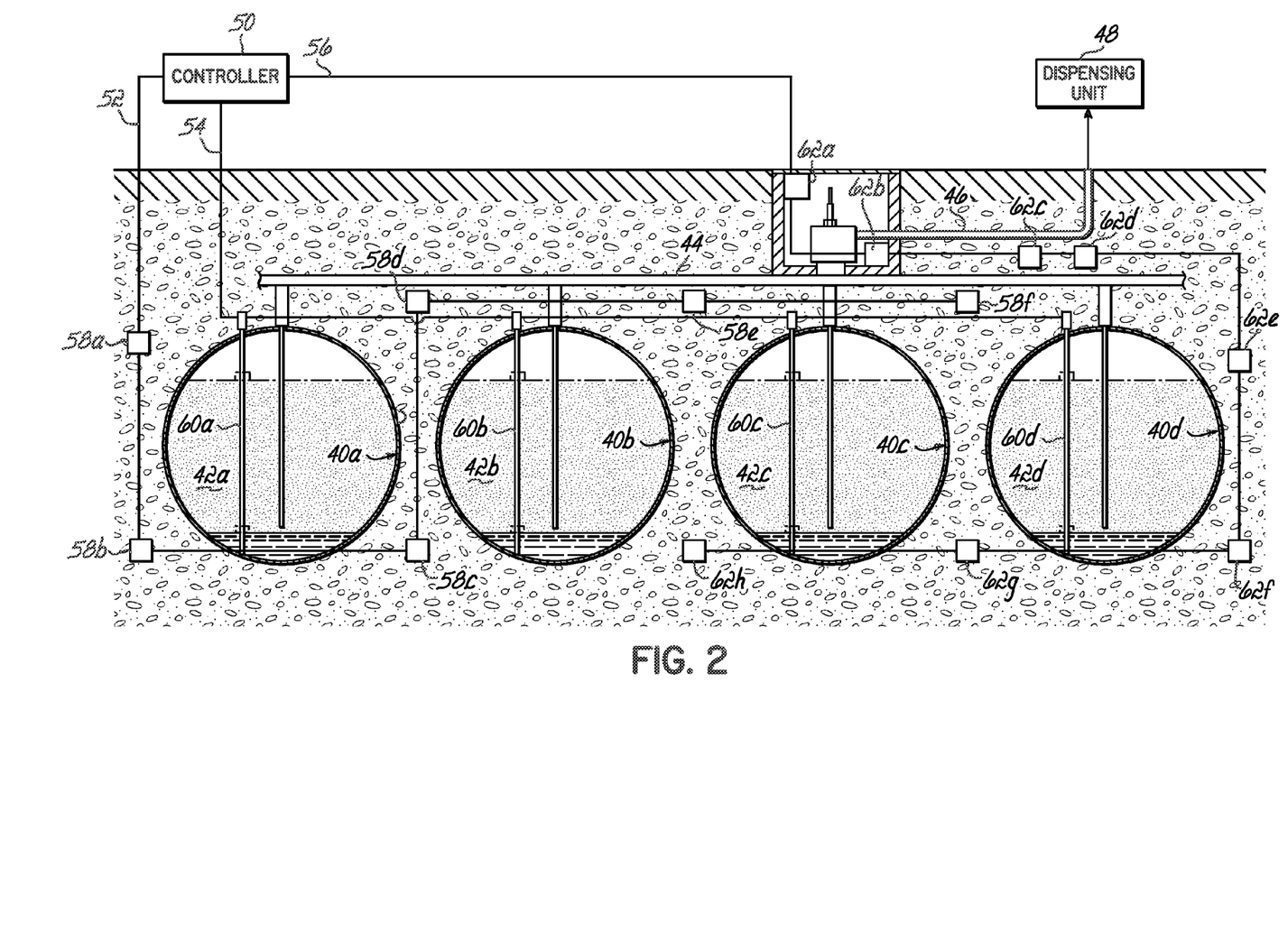
FIG. 2 is a schematic illustration of a fuel dispensing system incorporating a sensing device arrangement consistent with an embodiment of the invention.

For example, in the embodiment depicted in FIG. 2, sensing devices 60a-60d on connection 54, which may be probes monitoring tank levels and possibly fluid temperatures, pressures and/or densities, may be limited to a maximum of about four per ISB connection. As noted above fewer or more probes may be used depending on the power requirements of the probes and/or the limit established by the ISB. The limit allows for power sufficient to activate one probe while the remaining probes are in a low power state. Alternatively, the sensing devices 58a-58f and 62a-62g, may be sensors that have power requirements different from the probes above (typically less than) allowing for more sensors, e.g., in excess of eight, to be connected together. The sensors, similar to the probes, would be limited such that the power requirements to have one active sensor with the remaining sensors in a low power state along with a summation of other electrical characteristics such as inductance and capacitance would be less than the maximum allowed by the ISB. Other embodiments with other types of probes or sensors may have other limits as to the number of sensing devices that can be connected together. Still other embodiments may be limited as to both the number and types of sensing devices connected together.

Figure 3:
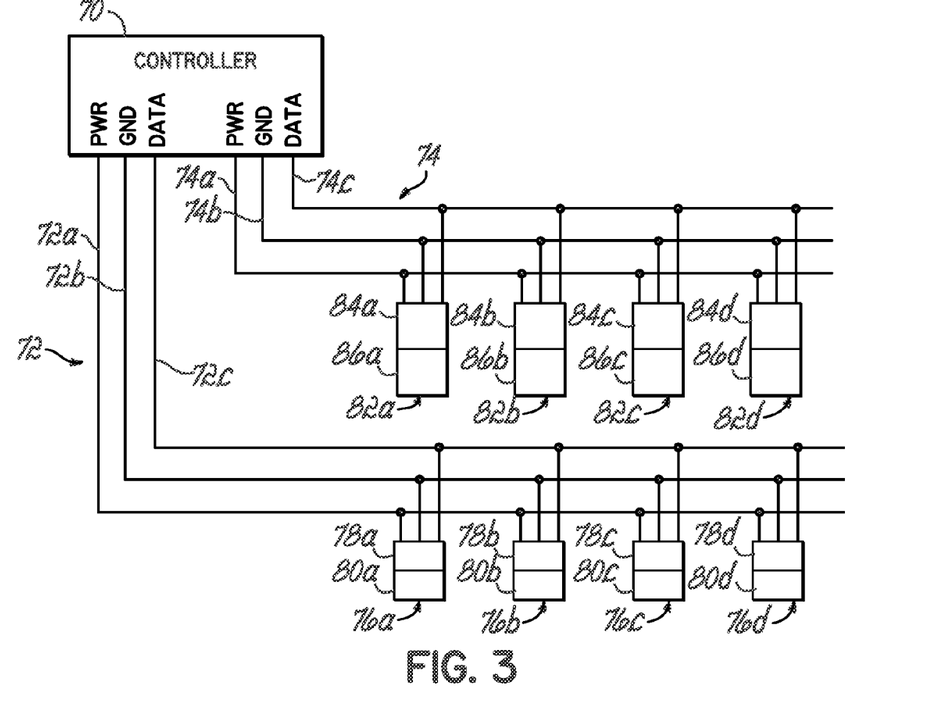
FIG. 3 is a portion of an electrical schematic showing the electrical connections between the sensing devices and the controller of FIG. 2.

The sensing devices may be configured in a multi-drop configuration in some embodiments as illustrated in FIG. 3. In this regard, controller 70 communicates through busses 72 and 74 (e.g., cables) with sensing devices 76a-76d and 82a-82d respectively. In this embodiment, and unlike conventional configurations, the bus connection includes three wires, for example wires 72a, 72b, and 72c, to supply power and ground to the sensing devices, as well as a single bi-directional data line for communication between the sensing devices 76a-76d and controller 70. Controller 70 uses asynchronous communications to communicate between the sensing devices 76a-76d on the data line 72c. Sensing devices 76a-76d and 82a-82d may include an interface component 78a-78d, 84a-84d, which is electrically coupled to an active or passive sensing component 80a-80d, 86a-86d. In some embodiments, the interface component 78a-78d, 84a-84d may include a microprocessor operable to communicate with the controller 70 and store a unique identifier and sensing device characteristics such as capacitance, inductance, threshold values, manufacturer/manufactured date, software version, etc. In a low power state, the sensing devices 76a-76d, 82a-82d maintain a power level sufficient to supply power to the microprocessor in the interface component 78a-78d, 84a-84d such that the microprocessor can be in communication with the controller 70, while the remainder of the sensing device 76a-76d, 82a-82d is powered off or waiting in a dormant or standby condition.

To avoid data collisions on the single data line, the controller only communicates with one of the sensing devices at a time. In order to communicate, the controller needs to be able to identify each of the sensing devices on the bus. To this end, each sensing device has a unique identification that may be transmitted to the controller over the single bi-directional data line (e.g., 72c, 74c). The controller learns the identity of the sensing devices during a start-up discovery process illustrated in the flowchart in FIG. 4, as will now be described. In an embodiment, circuitry as is generally known in the art is used on the bus to make the data line low (e.g. about zero volts) or high (e.g. about 5 volts). The data line in its dormant state is pulled low by a pull down resistor to ground. During the discovery process, in some embodiments when transmitting data, a sensing device actively makes the data line high, but when it needs to output a zero, it releases the drive to the data line and allows the pull down resistor to drive the data line low. In other embodiments, due to long cable runs (e.g., in excess of approximately 1,000 feet), the sensing device may itself briefly drive the data line low to overcome the capacitance in the cable.

Figure 4:
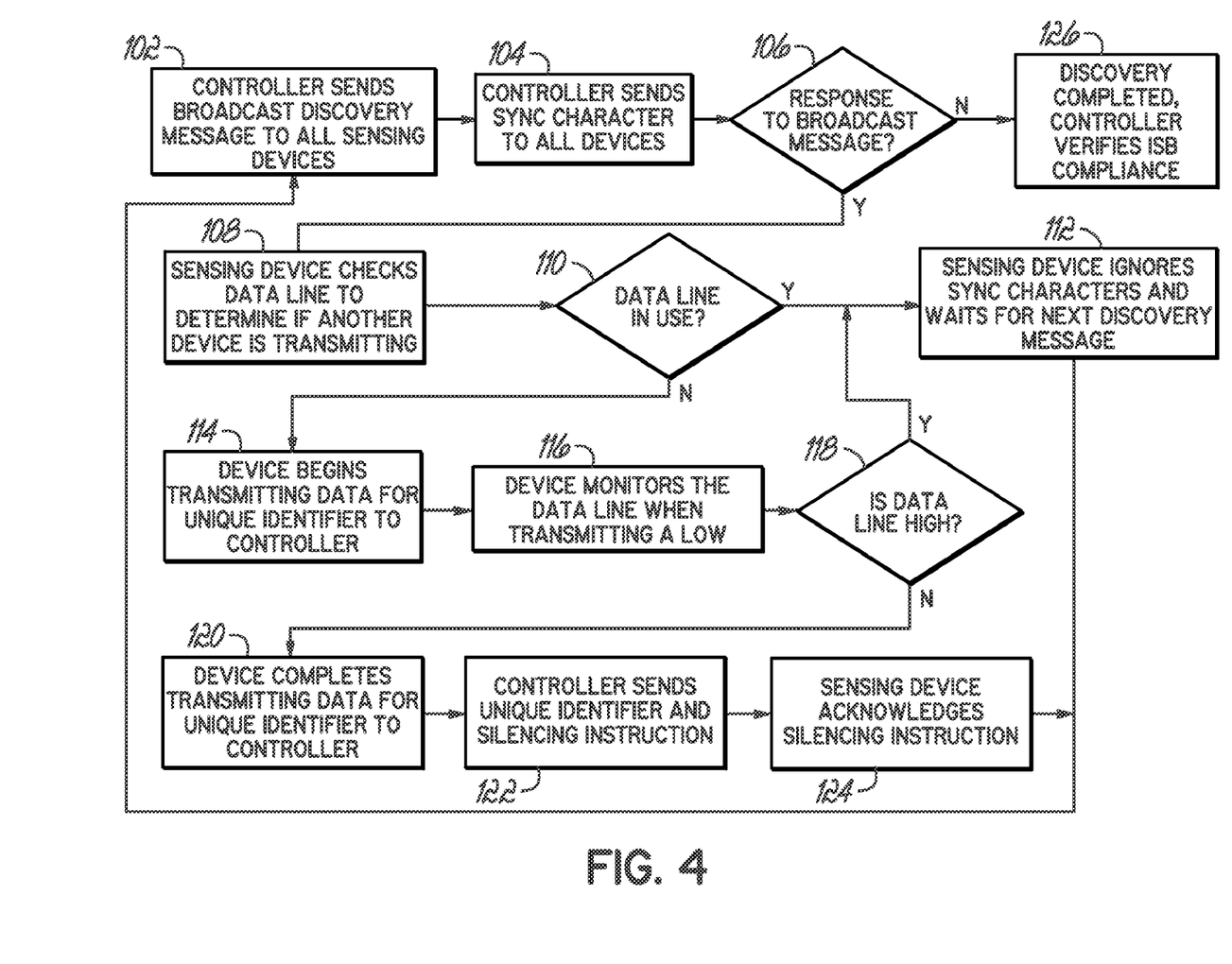
FIG. 4 is a flowchart depicting a discovery sequence when the controller of FIGS. 3 and 4 first powers up or is reset.

To identify the sensing devices on a bus, the controller sends a broadcast discovery message to all of the sensing devices on the bus in block 102. The controller then sends a sync character to all of the sensing devices in block 104 requesting that the sensors transmit their unique identification. Because the individual sensing devices are not clocked together, the sensing devices may not simultaneously respond to the sync character. If there is a device to respond to the discovery message and sync character ("yes" branch of decision block 106), the sensing device checks the data line to ascertain if another sensing device is already transmitting in block 108. If the data line is in use ("yes" branch of decision block 110), then another sensing device is currently using the data line to transmit data and the current sensing device waits in a low power state, ignoring subsequent sync characters from the controller and waits for the next broadcast of the discovery message in block 112. If, however, the data line is not in use ("no" branch of decision block 110), then there is no other sensing device communicating on the data line and the current sensing device begins to transmit data to the controller in block 114.

In one embodiment, the sensing device transmits a unique identifier, e.g. serial number or other identifier, to the controller as a series of bytes composed of bits. When the sensing device transmits a bit representing a "1", the sensing device drives the data line high. When the sensing device transmits a bit representing a "0", the sensing device stops driving the data line high and passively allows the pull down resister to pull the data line low. Approximately midway during the transmission of the "0" the sensing device monitors the data line in block 116. If the data line is high ("yes" branch of decision block 118), then the sensing device detects another sensing device of the plurality of sensing devices is transmitting. The current sensing device then stops transmitting and waits in a low power state, ignoring subsequent sync characters from the controller and waits for the next broadcast of the discovery message in block 112 from the controller. If the data line is low ("no" branch of decision block 118) then the sensing device continues to send data until the sensing device completes the transmission of the unique identifier in block 120, continuing to monitor the data line when sending "0" bits. In other embodiments, other methods of avoiding data collisions may be implemented.

Each byte of the unique identifier is transmitted in response to a sync character from the controller. Moreover, in some embodiments, the sensing device may also transmit other information related to the sensing device during the discovery process as discussed further below. After receiving all of the bytes associated with the unique identifier, the controller then sends the unique identifier back out on the data line with a silencing instruction in block 122. Resending the unique identifier operates as a double check that the proper sensing device on the bus is receiving the silencing instruction. The sensing device acknowledges the silencing instruction in block 124 and then ignores any subsequent discovery requests and sync characters sent by the controller. The process continues at block 102 as the controller continues to broadcast discovery messages until there are no further responses on the data line ("no" branch of decision block 106). At this point, in block 126, the discovery has completed and the controller may verify compliance of the sensing devices on the bus with the ISB as discussed in more detail below. In some embodiments, the controller is operable to shut down the bus and the sensing devices if the bus and sensing devices exceed the limits of the ISB. At any point, the controller may resume the discovery sequence by sending a global reset message to all of the devices on the bus.

Each sensing device contains details of its type and electrical characteristics along with its description, which may be sent to the controller during the discovery process. Additional information, such as voltage, current, inductance, and capacitance levels as well as manufactured date and software version may also be sent to the controller. An operator may additionally add information related to the physical location of the sensing device into the controller. The controller at this point has enough information to process the data from the sensing devices without any operator intervention in addition to verifying proper installation and compliance with the ISB.

Each sensing device has certain entity parameters (e.g. voltage, current, inductance and capacitance) that must match the entity parameters of the ISB for the safe operation of a gas station, for example. Traditionally it was up to the installer to total these parameters along with any inductance and capacitance values associated with the network cable run and manually match them to the ISB to verify if the network cable run and ultimately the site was safe. For example, in a four sensing device configuration, the inductance values and capacitance values of each of the sensing devices is summed and added to the inductance value and capacitance value of the connecting cable by the installer to calculate values for the sensing device arrangement. The installer would then compare the sensing device arrangement values to the limits established by the ISB. By putting the entity parameters within the sensing device and transmitting them to the controller, the process becomes more automated, eliminating the potential error introduced by operator input and manual calculations to verify that the site is safe. The controller has access to the ISB parameters and the ability to total and check the sensing device parameters against the ISB, thus allowing it refuse to run if an unsafe condition exists.

Threshold values may also be programmed into the sensing devices so that the controller is only sent information when one of its threshold values is exceeded, which may assist in reducing traffic on the data line. To ensure that the data that is stored in the controller is relatively current, in some embodiments, the sensing devices will periodically send sensor data even if the threshold value has not been exceeded.

Figure 5:
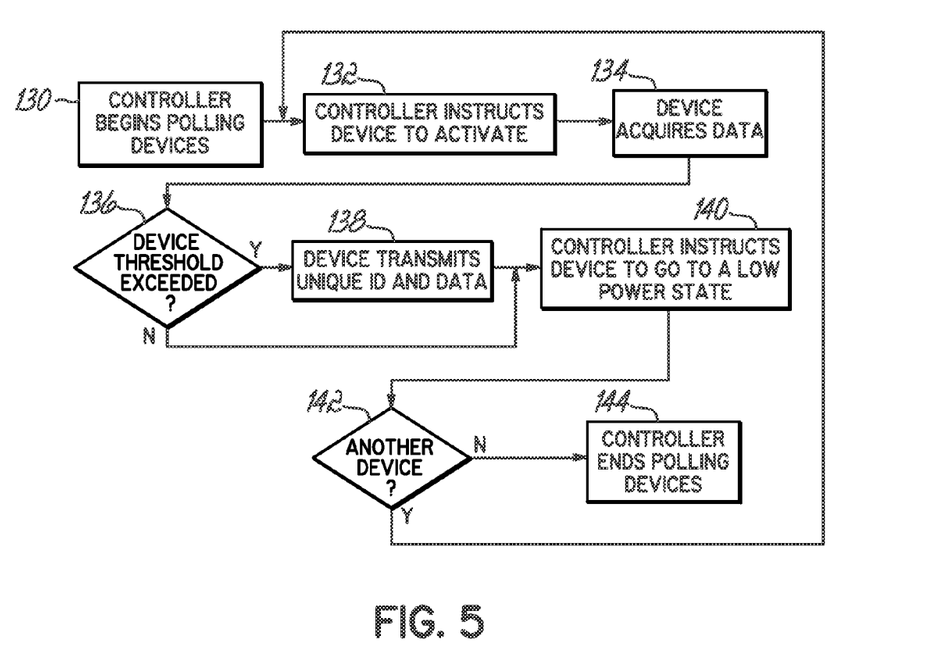
FIG. 5 is a flowchart depicting polling of the sensing devices connected to the controller that have been discovered in FIG. 4.

The flowchart in FIG. 5 illustrates a process that the controller may use to acquire data from the sensing devices. The controller begins by polling the sensing devices on the bus in block 130. In some embodiments, as with the embodiment in FIG. 5, the sensing devices are individually powered on, while others remain in a low power state, such as a dormant mode or a sleep mode. For example, in the low power state, all of the interface components of the sensing devices may be communicating with the controller while the sensor components are off/powered down. The controller then instructs one of the sensing devices to activate in block 132. The sensing device acquires data in block 134, and may, in some embodiments, transmit the data directly to the controller. In other embodiments, the acquired data is checked against a threshold value of the sensing device and if the data value exceeds the threshold ("yes" branch of decision block 136), the data is transmitted to the controller in block 138. In some embodiments, the unique identifier may also accompany the data transmission. As discussed above, transmitting data only when a threshold is exceeded may assist in reducing data traffic on the data line. The controller then instructs the sensing device to deactivate, returning the sensing device to its low power state in block 140. If another sensing device is connected to the bus and has not acquired data ("yes" branch of decision block 142), then the process continues with the next sensing device at block 132. If all sensing devices have been polled ("no" branch of decision block 142), the controller ends the polling of the devices in block 144.

As shown in the illustrations and descriptions of the embodiments above, the sensing device arrangement overcomes the challenges of prior arrangements by configuring sensing devices in a multi-drop configuration, thereby reducing the number of ports and ISBs required to connect the sensing devices to the controller, and lowering the overall costs of the system. The arrangement also reduces the amount of wiring necessary as fewer cables are needed to connect the sensing devices to the controller, further lowering the cost and reducing the complexity of the installation. Additionally, each cable includes only three wires as opposed to conventional cables having a four wire arrangement. Thus, conduit sizes may be correspondingly reduced. Automatic detection of the sensing devices removes or reduces costs associated with installation and reduces potential sources of error from the sensing device arrangement by reducing the tasks associated with an operator.

While the foregoing description has set forth various embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A sensing device arrangement for a fuel storage system comprising:
   at least one storage tank;
   a plurality of sensing devices positioned in or around the at least one storage tank; and
   a controller in electrical communication with the plurality of sensing devices, the controller configured to communicate with each sensing device of the plurality of sensing devices on a single bi-directional data line,
   wherein the electrical communication is configured to use an asynchronous communications protocol and comprises:
      a multi-drop configuration of the plurality of sensing devices communicating over the single bi-directional line.

2. The sensing device arrangement of claim 1 wherein the sensing devices are operable to monitor a property of a fluid in the storage tank.

3. The sensing device arrangement of claim 2 wherein the sensing devices comprise probes and wherein the probes are configured to monitor a property selected from the group consisting of a level of the fluid in the storage tank, a temperature of the fluid in the tank, a pressure of the fluid in the tank, a density of the fluid in the tank, and combinations thereof.

4. The sensing device arrangement of claim 1 wherein the sensing devices are operable to monitor a property outside of the tank.

5. The sensing device arrangement of claim 4 wherein the sensing devices comprise sensors and wherein the sensors are configured to monitor properties selected from the group consisting of temperature, pressure, hydrocarbon levels, and combinations thereof.

6. The sensing device arrangement of claim 1 wherein a sensing device of the plurality of sensing devices comprises:
   an interface component having a microprocessor operable to communicate with the controller; and
   an active or passive sensing component electrically coupled to the interface component.

7. The sensing device arrangement of claim 6 wherein the interface component is operable to store a unique identifier for the sensing device.

8. The sensing device arrangement of claim 6 wherein the interface component is operable to store sensing device characteristics selected from the group consisting of voltage, current, capacitance, inductance, threshold values, manufacturer, manufactured date, software version, and combinations thereof.

9. A method of sensing a property in or outside of a fuel storage tank by a plurality of sensing devices in a multi-drop configuration, the method comprising:
   activating a sensing device of the plurality of sensing devices by a controller;
   acquiring data by the sensing device;
   transmitting the data from the sensing device to the controller over a single bi-directional data line; and
   instructing the sensing device to change to a low power state by the controller,
   wherein the data transmission uses an asynchronous communications protocol.

10. The method of claim 9 further comprising:
    activating a subsequent sensing device of the plurality of sensing devices by the controller;
    acquiring data by the subsequent sensing device;
    transmitting the data from the subsequent sensing device to the controller over the single bi-directional data line; and
    instructing the subsequent sensing device to change to a low power state by the controller.

11. The method of claim 9 wherein transmitting the data comprises:
    comparing the data to a threshold value for the sensing device; and
    in response to exceeding the threshold value, transmitting the data from the sensing device to the controller.

12. The method of claim 11 wherein transmitting the data further comprises:
    periodically transmitting the data from the sensing device to the controller regardless of the threshold value.

13. The method of claim 9 wherein the sensing device is a probe and wherein acquiring data comprises:
    measuring a property selected from the group consisting of a level of the fluid in the storage tank, a temperature of the fluid in the tank, a pressure of the fluid in the tank, a density of the fluid in the tank, and combinations thereof.

14. The method of claim 9 wherein the sensing device is a sensor and wherein acquiring data comprises:
    measuring a property selected from the group consisting of temperature, pressure, hydrocarbon levels, and combinations thereof.

15. A method of recognizing sensing devices in a sensing device arrangement for a fuel storage system, the method comprising:
    recognizing a plurality of sensing devices by a controller over a single bi-directional data line;
    broadcasting a discovery message from the controller to a plurality of sensing devices in electrical communication with the controller over the single bi-directional data line;
    transmitting a sync character from the controller to the plurality of sensing devices over the single bi-directional data line; and
    transmitting a unique identification from a sensing device of the plurality of sensing devices to the controller over the single bi-directional data line.

16. The method of claim 15 further comprising:
    in response to receiving the unique identification, transmitting a silencing instruction from the controller to the sensing device,
    wherein the silencing instruction causes the sensing device to ignore further discovery messages and sync characters sent from the controller.

17. The method of claim 15 further comprising:
    broadcasting a subsequent discovery message from a controller to a plurality of sensing devices in electrical communication with the controller over the single bi-directional data line;
    transmitting a subsequent sync character from the controller to the plurality of sensing devices over the single bi-directional data line; and transmitting a unique identification from a subsequent sensing device of the plurality of sensing devices that has not received a silencing instruction to the controller over the single bi-directional data line.

18. The method of claim 17 further comprising:

in response to receiving the unique identification, transmitting a silencing instruction from the controller to the subsequent sensing device.

19. The method of claim 15 wherein individually retrieving the unique identification comprises at a sensing device of the plurality of sensing devices:

monitoring the single bi-directional data line connecting the plurality of sensing devices to ascertain if another sensing device of the plurality of sensing devices is already transmitting; and in response to no transmissions on the single bi-directional data line, transmitting a first byte of the unique identification of the sensing device to the controller, receiving a subsequent sync character from the controller, and in response to receiving the subsequent sync character, transmitting a next byte of data representing the unique identification of the sensing device to the controller.

20. The method of claim 19 further comprising in response to no transmissions on the single bi-directional data line:

receiving from the controller a silencing instruction to change from an active state to a low power state and ignore further discover message broadcasts and sync characters from the controller.

21. The method of claim 19 wherein transmitting a byte of data comprises:

driving the single bi-directional data line high when transmitting a bit value of one (1);

passively allowing a pull down resistor to pull the single bi-directional data line low when transmitting a bit value of zero (0);

monitoring the single bi-directional data line when transmitting the bit value of zero (0); and in response to a high value on the date line when transmitting the bit value of zero (0), ignoring the subsequent sync character until a subsequent broadcast of a discovery message.

22. The method of claim 21 wherein driving the ling high comprises driving the line to approximately 5 volts.

23. The method of claim 21 wherein pulling the line low comprises pulling the line to approximately 0 volts.

24. The method of claim 19 further comprising:

transmitting a characteristic of the sensing device with the unique identification to the controller.

25. The method of claim 24 wherein transmitting the characteristic comprises:

transmitting a characteristic from a group consisting of a type of sensing device, a voltage level of the sending device, a current level of the sensing device, a capacitance of the sensing device, an inductance of the sensing device, a description of the sensing device, a manufacturing date of the sensing device, a software version used with the sensing device, and combinations thereof.

26. A method of determining compliance between a sensing device arrangement and an intrinsic safety barrier for a fuel storage system, the method comprising:

broadcasting a discovery message over a single bi-directional data line to discover a plurality of sensing devices;

receiving at a controller, electrical characteristics of the plurality of sensing devices;

calculating a characteristic of the sensing device arrangement using the characteristics transmitted by the plurality of sensing devices; and verifying compliance with the intrinsic safety barrier.

27. The method of claim 26 further comprising:

in response to the characteristic of the sensing device arrangement being out of compliance with the intrinsic safety barrier, shutting down the sensing device arrangement.

28. The method of claim 26 wherein transmitting the characteristic comprises:

transmitting a characteristic from a group consisting of a voltage level of the sending device, a current level of the sensing device, a capacitance of the sensing device, an inductance of the sensing device, and combinations thereof.

* * * * *

UNITED STATES PATENT AND TRADEMARK OFFICE
CERTIFICATE OF CORRECTION

PATENT NO. : 7,825,816 B2
APPLICATION NO. : 11/841465
DATED : November 2, 2010
INVENTOR(S) : Ian F. Jarvie and Przemyslaw Olaf Iwaszczyszyn It is certified that error appears in the above-identified patent and that said Letters Patent is hereby corrected as shown below:

On the Title Page insert:
-- Item (73) Assignee:   Delaware Capital Formation, Inc. Wilmington, DE (US) --

Column 1
Lines approx. 43-44, "... delivered to sensing device ..." should read -- delivered to a sensing device --

Column 3
Line approx. 7, "... instructions from the to the sensing ..." should read -- instructions to the sensing --

Column 3
Line approx. 31, "... value exists on the date line when ..." should read -- value exists on the data line when --

Column 6
Line 5, "... through busses 72 ..." should read -- through buses 72 --

Column 8
Lines 3-4, "... inductance values and capacitance values of ... is summed and added to ..." should read -- inductance values and capacitance values of ... are summed and added to --

Column 8
Lines approx. 16-17, "... thus allowing it refuse to run ..." should read -- thus allowing it to refuse to run --

Column 11
Line 30, "... ignore further discover message broadcasts ..." should read -- ignore further discovery message broadcasts --

Signed and Sealed this
Eighth Day of February, 2011

David J. Kappos
*Director of the United States Patent and Trademark Office*

CERTIFICATE OF CORRECTION (continued)
U.S. Pat. No. 7,825,816 B2

Column 11
Line 41, "... value on the date line when ..." should read -- value on the data line when --

Column 12
Line 1, "... driving the ling high ..." should read -- driving the line high --

Column 12
Line 11, "... voltage level of the sending ..." should read -- voltage level of the sensing --

Column 12
Line 36, "... voltage level of the sending ..." should read -- voltage level of the sensing --